US012008998B2

(12) United States Patent
Tracey

(10) Patent No.: US 12,008,998 B2
(45) **Date of Patent: *Jun. 11, 2024**

(54) AUDIO SYSTEM HEIGHT CHANNEL UP-MIXING

(71) Applicant: Bose Corporation, Framingham, MA (US)

(72) Inventor: James Tracey, Norfolk, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,293

(22) Filed: Jun. 27, 2022

(65) Prior Publication Data

US 2022/0328054 A1 Oct. 13, 2022

Related U.S. Application Data

(63) Continuation of application No. 17/088,062, filed on Nov. 3, 2020, now Pat. No. 11,373,662.

(51) Int. Cl.

| | |
|---|---|
| ***G10L 19/008*** | (2013.01) |
| ***H04S 1/00*** | (2006.01) |
| ***H04S 5/00*** | (2006.01) |
| *H04S 3/00* | (2006.01) |

(52) U.S. Cl.

CPC ............ *G10L 19/008* (2013.01); *H04S 1/007* (2013.01); *H04S 5/005* (2013.01); *H04S 3/008* (2013.01); *H04S 2400/01* (2013.01)

(58) Field of Classification Search

CPC . G10L 19/008; G10L 19/167; G10L 19/0204; H04S 2420/03; H04S 3/02; H04S 2400/01; H04S 2420/11

USPC .................. 381/20, 307, 17, 22, 23; 700/94

See application file for complete search history.

(56) References Cited

U.S. PATENT DOCUMENTS

| | | | | |
|---|---|---|---|---|
| 2008/0097750 | A1* | 4/2008 | Seefeldt | G10L 19/008 381/20 |
| 2013/0156431 | A1* | 6/2013 | Sun | H04J 14/0298 398/58 |
| 2014/0233762 | A1* | 8/2014 | Vilkamo | G10H 1/183 381/119 |
| 2017/0245055 | A1* | 8/2017 | Sun | H04S 1/002 |
| 2019/0131946 | A1* | 5/2019 | Prior | H04R 3/00 |
| 2020/0058311 | A1* | 2/2020 | Goodwin | G10L 19/008 |

* cited by examiner

*Primary Examiner* — Alexander Krzystan

(57) ABSTRACT

Audio system height channel up-mixing that is configured to develop two or more height channels from audio sources that do not include height-related encoding. The up-mixing involves determining correlations and normalized channel energies between input audio signals. At least two height channels (e.g., left and right height audio signals) are developed from the correlations and normalized energies.

20 Claims, 4 Drawing Sheets

AUDIO SYSTEM HEIGHT CHANNEL UP-MIXING

PRIORITY CLAIM

This application is a continuation of U.S. patent application Ser. No. 17/088,062, filed Nov. 3, 2020, where the entire contents of the application are hereby incorporated by reference.

BACKGROUND

This disclosure relates to virtually localizing sound in a surround sound audio system.

Surround sound audio systems can virtualize sound sources in three dimensions using audio drivers located around and above the listener. These audio systems are expensive, and may need to be custom designed for the listening area.

SUMMARY

All examples and features mentioned below can be combined in any technically possible way.

In one aspect a computer program product having a non-transitory computer-readable medium including computer program logic encoded thereon, when performed on an audio system with at least two audio drivers and that is configured to input audio signals that include at least left and right input audio signals and render at least left and right height audio signals that are provided to the drivers, causes the audio system to determine correlations between input audio signals, determine normalized channel energies of input audio signals, and develop at least left and right height audio signals from the determined correlations and normalized channel energies.

Some examples include one of the above and/or below features, or any combination thereof. In some examples the computer program logic further causes the audio system to perform a Fourier transform on input audio signals. In an example the correlations are based on the Fourier transform. In an example the Fourier transform results in a series of bins and the correlations are based on the bins. In an example the normalized channel energies are based on the Fourier transform.

Some examples include one of the above and/or below features, or any combination thereof. In some examples the Fourier transform results in a series of bins. In an example the computer program logic further causes the audio system to partition the bins using sub-octave spacing. In an example the correlations and normalized channel energies are separately determined for the bins. In an example the computer program logic further causes the audio system to time smooth and frequency smooth the partitions to develop smoothed correlations and smoothed normalized channel energies. In an example the height audio signals are extracted for the partitions as a function of both the smoothed correlations and the smoothed normalized channel energies.

Some examples include one of the above and/or below features, or any combination thereof. In some examples the computer program logic causes the audio system to develop left front height, right front height, left back height, and right back height audio channel signals. In some examples the computer program logic further causes the audio system to develop de-correlated left and right channel audio signals. In an example the computer program logic further causes the audio system to perform cross-talk cancellation on the de-correlated left and right channel audio signals. In an example the cross-talk cancellation adds a delayed, inverted, and scaled version of the de-correlated left channel audio signal to the right channel audio signal, and adds a delayed, inverted, and scaled version of the de-correlated right channel audio signal to the left channel audio signal. In an example cross-talk cancellation causes the left channel audio signal to split into separate low band and high band left channel audio signals and separate low band and high band right channel audio signals, process the high band left and right channel audio signals through a head shadow filter, a delay, and an inverting scaler to develop filtered high band left and right channel audio signals, combine the filtered high band left and right channel audio signals with the high band left and right channel audio signals to develop a first combined signal, and combine the first combined signal with the low band left and right audio channel signals, to develop a cross-talk cancelled signal.

In another aspect an audio system includes multiple drivers configured to reproduce at least front left, front right, front center, left height, and right height audio signals, and a processor that is configured to determine correlations between input audio signals, determine normalized channel energies of input audio signals, develop at least left and right height audio signals from the determined correlations and normalized channel energies, and provide the left and right height audio signals to the drivers.

Some examples include one of the above and/or below features, or any combination thereof. In some examples the processor is further configured to perform a Fourier transform on input audio signals, wherein the correlations and the normalized channel energies are based on the Fourier transform. In some examples the Fourier transform results in a series of bins, and the processor is further configured to partition the bins using sub-octave spacing and separately determine the correlations and normalized channel energies for the bins. In an example the processor is further configured to cause the audio system to develop de-correlated left and right channel audio signals and perform cross-talk cancellation on the de-correlated left and right channel audio signals.

DETAILED DESCRIPTION

As is well known in the audio field, surround sound audio systems can have multiple channels (often, 5 or 7 channels, or more) that are more or less arranged in a horizontal plane in front of, to the side of, and behind the listener. The system can also have multiple height channels (often, 2 or 4, or more) that are arranged to provide sound from above the listener. Finally, the system can have one or more low frequency channels. As an example, a 5.1.4 system will have 5 channels in the horizontal plane, 1 low-frequency channel, and 4 height channels.

Object-based surround sound technologies (e.g., Dolby Atmos and DTS:X) include a large number of tracks plus associated spatial audio description metadata (e.g., location data). Each audio track can be assigned to an audio channel or to an audio object. Surround sound systems for object-based audio may have more channels than a typical residential 5.1 system. For example, object-based systems may have ten channels, including multiple overhead speakers, in order to accomplish 3-D location virtualization. During playback the surround-sound system renders the audio objects in real-time such that each sound is coming from its designated spot with respect to the loudspeakers.

Legacy audio sources often include only two channels—left and right. Such sources do not have the information that allows height channels to be developed by current sound technologies. Accordingly, the listener cannot enjoy the full immersive surround sound experience from legacy audio sources.

The present disclosure comprises an up-mixer that is configured to develop two (or more) height channels from audio sources that do not include height-related encoding, e.g., stereo sources with left and right audio signals. Accordingly, the present up-mixing allows a listener to enjoy a more immersive audio experience than is otherwise available in a stereo input. The up-mixing involves determining correlations and normalized channel energies between input audio signals. At least two height channels (e.g., left and right height audio signals) are developed from the correlations and normalized energies.

Figure 1:
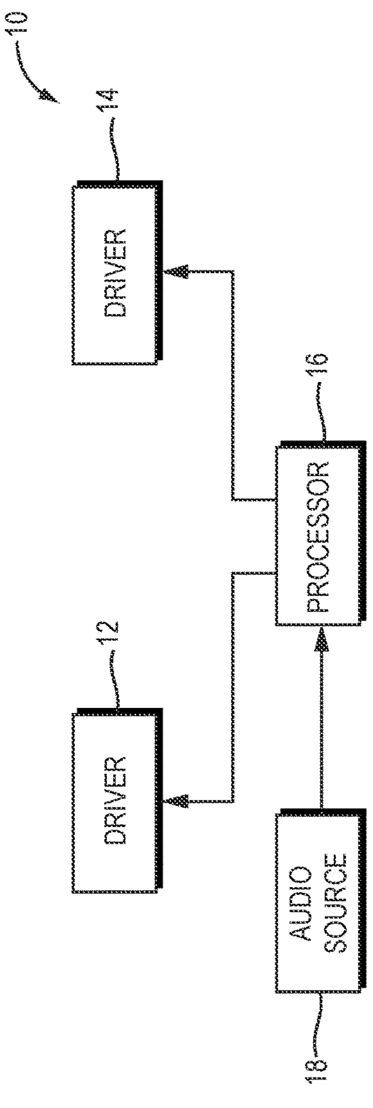
FIG. 1 is schematic diagram of an audio system that is configured to accomplish height channel up-mixing.

Audio system 10, FIG. 1, is configured to be used to accomplish height channel up-mixing of audio content provided to system 10 by audio source 18. In some examples, audio source 18 provides left and right channel (i.e., stereo) audio signals. In other examples the audio source comprises sources of surround sound audio signals that do not include height channels, such as Dolby 5.1-compatible audio. Audio system 10 includes processor 16 that receives the audio signals, processes them as described elsewhere herein, and distributes processed audio signals to some or all of the audio drivers that are used to reproduce the audio. In an example the processed audio signals include one or more height signals. In an example the processed audio signals include at least center, left, right and low frequency energy (LFE) signals. In some examples system 10 includes drivers 12 and 14, which may be but need not be the left and right drivers of a soundbar. Soundbars are often designed to be used to produce sound for television systems. Soundbars may include two or more drivers. Soundbars are well known in the audio field and so are not fully described herein. In an example the output signals from processor 16 define a 5.1.2 audio system with five horizontal channels (center, left, right, left surround, and right surround), one LFE channel, and right and left height channels. In an example the height channels are reproduced with left and right up-firing drivers that reflect sound off the ceiling.

Processor 16 includes a non-transitory computer-readable medium that has computer program logic encoded thereon that is configured to develop, from audio signals provided by audio source 18, at least left and right height audio signals that are provided to drivers 12 and 14, respectively. Development of height signals from input audio signals that do not contain height-related information (e.g., height objects or height encoding) is described in more detail below.

Figure 2:
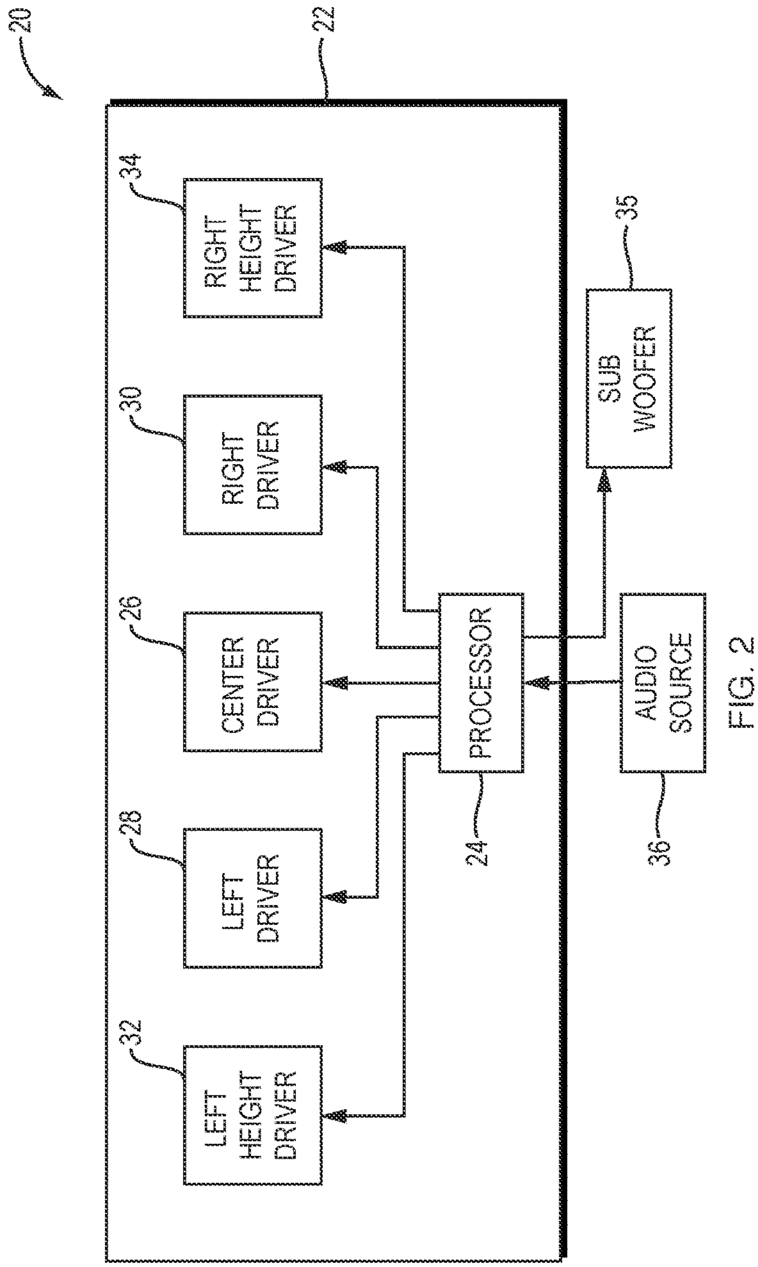
FIG. 2 is schematic diagram of a surround sound audio system that is configured to accomplish height channel up-mixing.

Soundbar audio system 20, FIG. 2, includes soundbar enclosure 22 that includes center channel driver 26, left front channel driver 28, right front channel driver 30, and left and right height channel drivers 32 and 34, respectively. In many but not all case drivers 26, 28, and 30 are oriented such that their major radiating axes are generally horizontal and pointed outwardly from enclosure 22, e.g., directly toward and to the left and right of an expected location of a listener, respectively, while drivers 32 and 34 are pointed up so that their radiation will bounce of the ceiling and, from the listener's perspective, appear to emanate from the ceiling. Soundbar audio system 20 also includes subwoofer 35 that is typically not included in enclosure 22 but is located elsewhere in the room, and is configured to reproduce the LFE channel. Finally, soundbar audio system 20 includes processor 24 (e.g., a digital signal processor (DSP)) that is configured to process input audio signals received from audio source 36. Note that in most cases the input audio signals would be received by signal reception and processing components that are not shown in FIG. 2 (for the sake of ease of illustration) and that provide the input signals to processor 24. Processor 24 is configured to (via programming) perform the functions described herein that result in the provision of height audio signals to drivers 32 and 34, as well as to other height drivers if such are included in the audio system. Note also that the present disclosure is not in any way limited to use with a soundbar audio system, but rather can be used with other audio systems that include audio drivers that can be used to play the height audio signals developed by the processor. Examples of such other audio systems include open audio devices that are worn on the ear, head, or torso and do not input sound directly into the ear canal (including but not limited to audio eyeglasses and ear wearables), and headphones.

Height Channel Up-Mixing

In examples described herein height-channel up-mixing is used to synthesize height components from audio signals that do not include height components. The synthesized height components can be used in one or more channels of an audio system. In some examples the height components are used to develop left height and right height channels from input stereo or traditional surround sound content. In some examples the height components are used to develop left front height, right front height, left rear height, and right rear height channels from input stereo or traditional surround sound content. The synthesized height components can be used in other manners, as would be apparent to one skilled in the technical field.

In some implementations, the height channel up-mixing techniques described herein can be used in addition to or as an alternative to other three-dimensional or object-based surround sound technologies (such as Dolby Atmos and DTS:X). Specifically, the height channel up-mixing techniques described herein can provide a similar height (or vertical axis) experience that is provided by three-dimensional or object-based surround sound technologies, even when the content is not encoded as such. For example, the height channel up-mixing techniques can add a height component to stereo sound to more fully immerse a listener in the audio content. In addition, the channel up-mixing techniques can be used to allow a soundbar that includes one or more upward firing drivers (or relatively upward firing drivers, such as those that are angled more toward the ceiling than horizontal, such as greater than 45 degrees relative to the soundbar's main plane) to add or increase a height component of the sound even where the content does not include a height component or the height-component containing content cannot otherwise be adequately decoded/rendered. For example, many soundbars use a single HDMI eARC connection to televisions to receive and play back audio content that includes a height component (such as Dolby Atmos or DTS:X content), but for televisions that do not support HDMI eARC, such audio content may not be able to be passed from the television to the soundbar, regardless of whether the television can receive the audio content. Thus, the height channel up-mixing techniques described herein can be used to address such issues.

Figure 3:
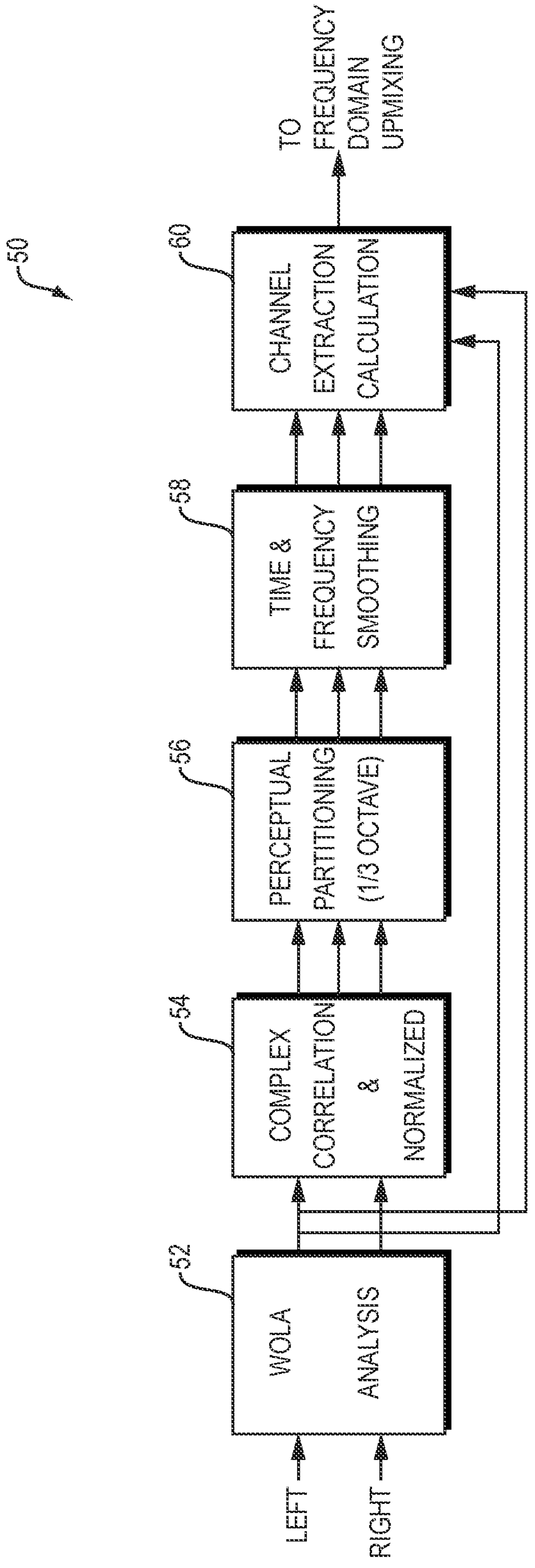
FIG. 3 is schematic diagram of aspects of an up-mixer that develops height channels from input stereo signals.

FIG. 3 is schematic diagram of aspects of an exemplary frequency-domain up-mixer 50 that is configured to develop up to four height channels from input left and right stereo signals. In an example up-mixer 50 is accomplished with a programmed processor, such as processor 24, FIG. 2. In WOLA Analysis 52, the incoming signals are processed using a weight, overlap, add discrete-time fast Fourier transform that is useful to analyze samples of a continuous function. Blocks of audio data (which in an example include 2048 samples) that serve as the inputs to the WOLA may be referred to as frames. WOLA analysis techniques are well known in the field and so are not further described herein. The outputs are resolved discrete frequencies or bins that map to input frequencies. The transformed signals are then provided to both the complex correlation and normalization function 54 and the channel extraction calculation function 60.

In complex correlation and normalization 54, correlation is performed on each FFT bin using the following approach: Consider each FFT bin for left and right channels to be a vector in the complex plane. The scalar projection of one vector onto the other is then computed using the expression Dot(Left, Right)/(mag(Left)*mag(Right)), Where mag(a)=Sqrt(Real(a)^2+Imag(a)^2). This results in a range of correlation values from −1 for negative correlation and +1 for positive correlation. Normalized Energy is calculated on each FFT bin using the following approach: Left channel Normalized Energy=mag(Left)/(mag(Left)+mag(Right)). Right channel Normalized Energy=mag(Right)/(mag(Left)+mag(Right)). This results in a range of 0.5 for equal energy and 1.0 or 0.0 for hard panned cases.

In perceptual partitioning 56, FFT bins are partitioned using sub-octave spacing (e.g., ⅓ octave spacing) and the correlation and energy values are calculated for each partition. Each partition's correlation value and energy are subsequently used to calculate up-mixing maps for each synthesized channel output. Other perceptually-based partitioning schemes may be used based on available processing resources. In an example the partitioning is effective to reduce 1024 bins to 24 unique values or bands.

In time and frequency smoothing 58, each partition band is exponentially smoothed on both the time and frequency axis using the following approaches. For time smoothing each partition's correlation and normalized energy is calculated using the expression: Psmoothed(i, n)=(1-alpha)*Punsmoothed(n)+alpha*Psmoothed(i, n−1), where alpha can have values between 0:1 and Psmoothed(i, n−1) represents the previous FFT frames result for the ith partition. For frequency smoothing each partition's correlation value is smoothing by a weighted average of its nearest neighbors. The closer to the current partition the larger the weight as such, Waverage(i)=Sum(Punsmoothed(j)/abs(j−i)), for all j where j !=I, then the final weighted average is Psmoothed(i)=(Waverage(i)+Punsmoothed(i))/(1.0+Sum(1.0/(abs(j−i))). This helps to eliminate the musical noise artifact which is sometimes present in frequency domain implementations.

In channel extraction calculation 60, channels are extracted for each partition on an energy-preserving basis as a function of both correlation and normalized channel energy. For hard panned content there is steering to ensure original panning is preserved; this is necessary since hard panned content will have correlation=0.0. The outputs of calculation 60 are processed through standard data formatting, WOLA synthesis and bass management techniques (not shown) to create a 5.1.4 channel output that includes left front height, right front height, left rear height, and right rear height channels. The four height channel signals can be provided to appropriate drivers, such as left and right height drivers of a soundbar, or dedicated height drivers. In some examples there are two height channels (left and right) and in other examples there are more than four height channels.

In an example input left and right audio signals are up-mixed by the audio system processor to create a 5.1.4 channel output. The five horizontal channels include left and right front, center, and left and right surround channels. The four height channels include left and right front height and left and right back height channels. Left, center, and right channels can be developed by determining an inter-aural correlation coefficient between −1.0 and 1.0 and determining left and right normalized energy values, as described above relative to complex correlation and normalization function 52. The center channel signal is determined based on a center channel coefficient multiplied separately with each of the left and right channel inputs. The center channel coefficient has a value greater than zero if the inter-aural correlation coefficient is greater than zero, else it is zero. The left and right channel signals are based on the energy that is not used in the center channel. In cases where the input is hard panned to the left or right the energy is kept in the appropriate input channel.

In an example these left and right channel signals are further divided into left and right front, left and right surround, left and right front height, and left and right back height signals. These divisions are based on the inter-aural correlation coefficient and the degree to which inputs are panned left or right. If the inter-aural correlation coefficient is greater than 0.5, no content is steered to the height or surround channels. Otherwise, front, front height, surround, and back height coefficients are determined based on the value of the inter-aural correlation coefficient and the degree of left or right panning. The front coefficient is used to determine new left and right channel output signal. The left and right front height signals are based on these new left and right channel output signals multiplied by their respective front height coefficients, while the left and right back height signals are based on these new left and right channel output signals multiplied by their respective back height coefficients. The left and right surround signals are based on these new left and right channel output signals multiplied by their respective surround coefficients. The new left and right channel output signals are blended with the original left and right input signals, as modified by the degree of panning, to develop the left and right channels.

A typical soundbar includes at least three separate audio drivers—left, right and center. In order to better reproduce height channels, the soundbar can also include a left height driver and a right height driver. The height drivers may be physically oriented such that their primary acoustic radiation axes are pointed up; this causes the sound to reflect off the ceiling such that the user is more likely to perceive that the sound emanates from above.

Cross-Talk Cancellation

In normal use of a soundbar the user is located more or less in front of the soundbar, in the acoustic far field (meaning that the user is located at least about two average wavelengths from the audio driver(s)). Traditional stereo reproduction introduces spatial distortion due to acoustic cross-talk wherein the left channel is heard by the left ear as well as the right ear and the right channel is heard by the right ear as well as the left ear. Cross-talk can be ameliorated by using the processor to accomplish transaural cross-talk cancellation, which is designed to remedy the problems caused by cross-talk by routing a delayed, inverted, and scaled version of each channel to the opposite channel (i.e., left to right, and right to left). The delay and gain are designed to approximate the additional propagation delay and the frequency dependent head shadow to the opposing ear. This additional signal will acoustically cancel the cross-talk component at the opposing ear.

However, this cancellation approach causes the correlated signal components (i.e., signal components common to the left and right channels) to introduce combing artifacts into the output. Combing occurs when a signal is delayed and added to itself. Combing can result in audible anomalies and so should be avoided. In the present cross-talk cancellation regime, steps are taken to ensure the signals being delayed and added together are de-correlated, thereby reducing or eliminating the combing artifacts.

Figure 4:
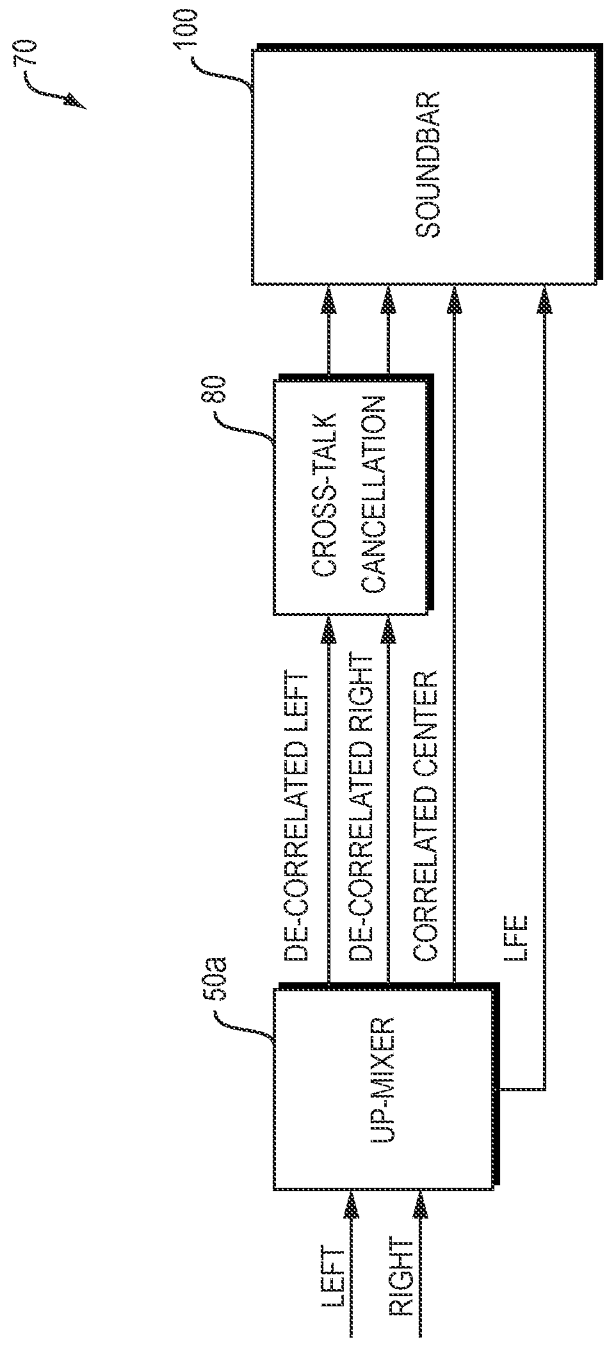
FIG. 4 is a schematic diagram of an up-mixer and cross-talk canceller for use with a four-axis soundbar.

FIG. 4 is a schematic diagram of an up-mixer and cross-talk canceller for use with a four-axis (or 3.1) soundbar with left, right, center, and LFE channels. A typical stereo input has both de-correlated and correlated frequency dependent components. To ensure distortion free or near distortion free cancellation, correlated components are separated from de-correlated components using the techniques described herein. As described above, the up-mixer 50*a* can be used to develop de-correlated left and right signals. It should be understood that de-correlated components of audio signals can be developed without the use of an up-mixer. In an example, optional up-mixer 50*a* (which may be considered a reformatter) can accept two channel input, and output 3.1 (i.e., de-correlated left and right, correlated center, and low-frequency energy (LFE) channels, in this example implementation). As up-mixer 50*a* is optional, some implementations need not use an up-mixer. Moreover, some implementations could use an optional down-mixer to reduce the number of input channels prior to playback. In other examples de-correlated components are developed by applying decorrelation algorithms such as a series of all-pass filters which possess random phase response. Note that the techniques described herein can be used for systems outputting any number of multiple channels, such as for outputting 2.0, 2.1, 3.0, 3.1, 5.0, 5.1, 7.0, 7.1, 5.1.2, 5.1.4, 7.1.2, 7.1.4, and so forth. Therefore, the cross-talk cancellation techniques could be used for stereo output from a two-speaker device or system to improve playback of correlated content in the audio. Also note that the techniques could be used for systems receiving audio input having any number of multiple channels, such as for 2 channel (stereo) input, 6 channel input (e.g., for 5.1 systems), 8 channel input (e.g., for 5.1.2 or 7.1 systems), 10 channel input (e.g., for 7.1.2 systems) and so forth.

Cross-talk cancellation can be used to virtualize source locations from input signals that do not include such source locations. The cross-talk cancellation techniques as variously described herein can be used separately from or together with the height channel up-mixing techniques variously described herein.

The de-correlated left and right signals are provided to cross-talk cancellation function 80. An example of a cross-talk cancellation function is described below relative to FIG. 5. The resulting signals, along with the correlated center channel and LFE signals, are then provided to soundbar 100.

Figure 5:
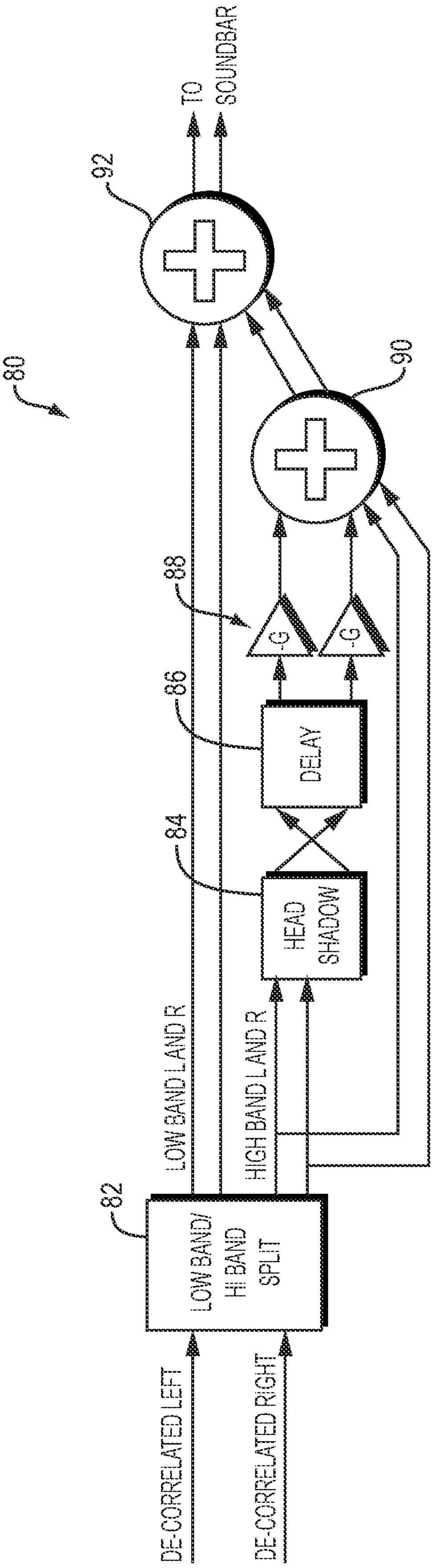
FIG. 5 is a more detailed schematic diagram of the cross-talk canceller of FIG. 4.

FIG. 5 is a more detailed schematic diagram of an example of the cross-talk canceller 80 of FIG. 4. Note that cross-talk cancellation can be used separately from the channel up-mixing, for example in cases where the input audio signals or data already defines the desired height channels or height objects, or when cross-talk cancellation is being used apart from height channel up-mixing, such as trans-aural spatial audio rendering used to virtualize multiple sound source locations. The de-correlated left and right signals are provided to low band/high band splitting function 82 that outputs low band and high band left and right signals. In an example splitter 82 is accomplished using band-pass filters of a type known in the technical field. In an example the frequency ranges of the two bands is selected to inhibit the loss of low-frequency response, since most low-frequency content is highly correlated. In this example the low and high frequencies are separated before cross-talk cancellation is performed. In one non-limiting example the low band encompasses from DC to about 200 Hz and the high band encompasses from about 200 to Fs/2 Hz. The high band signals are provided to a head shadow filter 84 which is meant to simulate the transfer function from the ipsilateral to the contralateral ear based on a pre-defined angle of arrival, and then a delay and inverted gain, 86 and 88, respectively, before being summed with the original high band signals by summer 90. The output is summed with the low band signals in summer 92, and then provided to the soundbar.

In some examples, such as that illustrated in FIG. 4, cross-talk cancellation is used together with height channel up-mixing. As described above, in other examples cross-talk cancellation is used without regard to height channel up-mixing.

In some examples, the height channel up-mixing and/or cross-talk cancellation techniques as variously described herein are presented as a controllable feature(s) that can be changed from a default state using, e.g., on-device controls, a remote control, and/or a mobile app. Such user-customizable controls could include enabling/disabling the feature(s) and/or customizing the feature(s) as desired. For example, a user-customizable feature for the height channel up-mixing could include changing a default relative volume for the virtualized height channels (i.e., relative to the volume of one or more of the other channels). In another example, a user could customize a primary listening location distance for the virtualized height channels to change how the height channels are directed in a given space. Moreover, the user-customizations could be associated with the input source and/or audio content, in some implementations. For example, a user may enable a height channel up-mixing feature when the input source is audio for video (A4V) content, such as when the input is from a connected television, but disable the feature for a music input source, such as when the input is a music streaming service. Further, a user may enable a height channel up-mixing feature when listening to music content (regardless of the input source), but disable the feature for podcast and audio book content (again, regardless of the input source).

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A computer-implemented method for an audio system with at least two audio drivers, the method comprising:
- determining correlations between input audio signals that do not include height components;
- determining normalized energies of the input audio signals; and
- developing at least left and right height audio signals from the determined correlations and normalized channel energies, wherein the at least left and right height audio signals are configured for playback using one or more of the at least two audio drivers.

2. The method of claim 1, further comprising performing a Fourier transform on the input audio signals prior to the determining of the correlations and prior to the determining of the normalized energies, thereby resulting in a series of bins to be used for at least one of the determining of the correlations and the determining of the normalized energies.

3. The method of claim 2, wherein the determined correlations are based on the series of bins from the Fourier transform.

4. The method of claim 2, wherein the determined normalized energies are based on the series of bins from the Fourier transform.

5. The method of claim 2, further comprising partitioning the series of bins using sub-octave spacing.

6. The method of claim 1, further comprising developing left front height, right front height, left back height, and right back height audio signals.

7. The method of claim 1, further comprising developing de-correlated left and right audio signals.

8. The method of claim 7, further comprising performing cross-talk cancellation on the de-correlated left and right audio signals.

9. The method of claim 1, wherein a user can enable and disable playback of the at least left and right height audio signals.

10. The method of claim 1, wherein a user can customize a volume of the at least left and right height audio signals that is relative to a volume of one or more other audio signals of the audio system.

11. An audio system comprising:
- at least two drivers; and
- at least one processor configured to
  - determine correlations between input audio signals that do not include height components,
  - determine normalized energies of the input audio signals, and
  - develop at least left and right height audio signals from the determined correlations and normalized energies, wherein the at least left and right height audio signals are configured for playback using one or more of the at least two audio drivers.

12. The audio system of claim 1, wherein the at least one processor is further configured to perform a Fourier transform on the input audio signals prior to the determining of the correlations and prior to the determining of the normalized energies, thereby resulting in a series of bins to be used for at least one of the determining of the correlations and the determining of the normalized energies.

13. The audio system of claim 12, wherein the determined correlations are based on the series of bins from the Fourier transform.

14. The audio system of claim 12, wherein the determined normalized energies are based on the series of bins from the Fourier transform.

15. The audio system of claim 12, wherein at least one processor is further configured to partition the series of bins using sub-octave spacing.

16. The audio system of claim 11, wherein the at least one processor is further configured to develop left front height, right front height, left back height, and right back height audio signals.

17. The audio system of claim 11, wherein the at least one processor is further configured to develop de-correlated left and right audio signals.

18. The audio system of claim 17, wherein the at least one processor is further configured to perform cross-talk cancellation on the de-correlated left and right audio signals.

19. The audio system of claim 11, wherein a user can enable and disable playback of the at least left and right height audio signals.

20. The audio system of claim 11, wherein a user can customize a volume of the at least left and right height audio signals that is relative to a volume of one or more other audio signals of the audio system.

* * * * *